United States Patent
Hirano

(10) Patent No.: US 8,938,629 B2
(45) Date of Patent: Jan. 20, 2015

(54) POWER CONTROL APPARATUS, METHOD FOR CONTROLLING THE SAME AND STORAGE MEDIUM

(75) Inventor: Yasuhiko Hirano, Yokohama (JP)

(73) Assignee: Canon Kabushiki Kaisha (JP)

( * ) Notice: Subject to any disclaimer, the term of this patent is extended or adjusted under 35 U.S.C. 154(b) by 301 days.

(21) Appl. No.: 13/469,303

(22) Filed: May 11, 2012

(65) Prior Publication Data

US 2012/0290856 A1    Nov. 15, 2012

(30) Foreign Application Priority Data

May 11, 2011 (JP) ................................. 2011-106623

(51) Int. Cl.

| G06F 1/00 | (2006.01) |
|---|---|
| G06F 1/32 | (2006.01) |
| G06F 15/173 | (2006.01) |
| H04N 1/00 | (2006.01) |
| H04N 1/46 | (2006.01) |
| G06F 1/26 | (2006.01) |
| H04N 1/32 | (2006.01) |
| G06K 15/00 | (2006.01) |

(52) U.S. Cl.
CPC .............. *G06F 1/3287* (2013.01); *G06F 1/266* (2013.01); *G06F 1/3206* (2013.01); *G06F 1/3284* (2013.01); *H04N 1/00344* (2013.01); *H04N 1/00896* (2013.01); *H04N 1/00954* (2013.01); *H04N 1/32523* (2013.01); *G06K 15/4005* (2013.01); *H04N 2201/0039* (2013.01); *H04N 2201/3202* (2013.01); *Y02B 60/1267* (2013.01)

USPC ........... 713/300; 713/320; 709/223; 358/406; 358/504

(58) Field of Classification Search
USPC .................................................. 713/300, 320
See application file for complete search history.

(56) References Cited

U.S. PATENT DOCUMENTS

| 5,339,445 | A * | 8/1994 | Gasztonyi | 713/324 |
|---|---|---|---|---|
| 8,023,842 | B2 * | 9/2011 | Motoyama | 399/37 |
| 8,375,228 | B2 * | 2/2013 | Kashyap | 713/300 |
| 8,432,561 | B2 * | 4/2013 | Ebisui | 358/1.14 |
| 8,456,669 | B2 * | 6/2013 | Bisset | 358/1.15 |
| 8,490,103 | B1 * | 7/2013 | Belady et al. | 718/104 |
| 8,570,564 | B2 * | 10/2013 | Coffey et al. | 358/1.15 |
| 8,612,780 | B2 * | 12/2013 | Hsin et al. | 713/300 |
| 2011/0051168 | A1 * | 3/2011 | Shibata | 358/1.13 |

FOREIGN PATENT DOCUMENTS

| JP | 2007221942 A | 8/2007 |
|---|---|---|
| JP | 2010225060 A | 10/2010 |

* cited by examiner

*Primary Examiner* — Stefan Stoynov
(74) *Attorney, Agent, or Firm* — Rossi, Kimms & McDowell LLP

(57) ABSTRACT

A power control apparatus uses a job history stored in a second storage unit to update, at a predetermined time interval, a power-off sequence table defining a sequence in which power supply is to be stopped for devices when a smart power meter has requested power supply reduction, inquires the smart power meter regarding the amount of power to be reduced when a power reduction request has been received therefrom, and stops power supply to devices in accordance with the reduction power amount, the device power consumption amounts, and the power-off sequence table.

16 Claims, 6 Drawing Sheets

FIG. 3

| DEVICE | POWER CONSUMPTION (STANDBY) | POWER CONSUMPTION (OPERATION) |
|---|---|---|
| A : CL A4 PRINTER | 15W | 400W |
| B : BW A4 PRINTER | 8W | 600W |
| C : CL A3 PRINTER | 60W | 550W |
| D : CL MFP | 25W | 1200W |
| E : BW MFP | 10W | 600W |

POWER CONTROL APPARATUS, METHOD FOR CONTROLLING THE SAME AND STORAGE MEDIUM

BACKGROUND OF THE INVENTION

1. Field of the Invention

The present invention relates to a power control apparatus, a method for controlling the same, and a storage medium.

2. Description of the Related Art

In recent years, review has been underway on load control services using an advanced-function power meter called a "smart meter" (hereinafter, referred to as a "smart power meter") that has a communication function and a function for managing other devices. With such a service, a load control event is issued in the case where the power supplied by a power company is insufficient, and the smart power meter that receives the load control event controls the power consumption of user-side devices by, for example, stopping the supply of power to devices.

Japanese Patent Laid-Open No. 2007-221942 proposes technology in which, in the control of the power consumption of multiple devices, the operation of multiple network-connected office automation devices is monitored, and if it has been detected that devices have entered a power saving mode or been powered off, power consumption is controlled by, for example, stopping the operation of air-conditioning equipment. Also, Japanese Patent Laid-Open No. 2010-225060 proposes technology in which a device is connected between an outlet and an apparatus, and control is performed such that power supply is stopped if it has been detected that a printer has transitioned to a power saving mode, and the printer is caused to revert to the power saving mode based on an image processing request.

However, this conventional technology has the problems such as the following. For example, with the power consumption control of the above-described conventional technology, the devices need to transition to the power saving mode or have been powered off when device power supply control is performed, and it is not possible to respond to load control (a power-off request) from a smart power meter. Also, the smart power meter does not have information on the sequence in which the connected devices should be powered off according to the frequency of use by users. In other words, if a high power consumption device is powered off in response to the load control (a power-off request), convenience will be impaired if that device is a device with a high frequency of use by users.

SUMMARY OF THE INVENTION

The present invention enables realization of a power control apparatus that, in response to load control (a power-off request) from a smart power meter, effectively performs power-off control, without impairing user convenience, according to a power-off sequence table obtained using a job history, a method for controlling the same, and a storage medium.

One aspect of the present invention provides a power control apparatus capable of communication with a plurality of devices, the power control apparatus comprising: a storage unit that stores a history of jobs executed by each of the devices; a determination unit that determines, among the plurality of devices, a device for which the power consumption is to be reduced, based on the job history stored by the storage unit; and a power control unit that performs control so as to reduce the power consumption of the device determined by the determination unit, in a case where a condition for reducing power consumption has been satisfied.

Another aspect of the present invention provides a method for controlling a power control apparatus capable of communication with a plurality of devices, the method comprising: storing a history of jobs executed by each of the devices; determining, among the plurality of devices, a device for which the power consumption is to be reduced, based on the stored job history; and reducing the power consumption of the device determined in the determination step, in a case where a condition for reducing power consumption has been satisfied.

Further features of the present invention will be apparent from the following description of exemplary embodiments with reference to the attached drawings.

BRIEF DESCRIPTION OF THE DRAWINGS

FIG. 3 is a diagram showing the power consumption of devices connected to the power control apparatus according to the first embodiment.

DESCRIPTION OF THE EMBODIMENTS

Figure 1:
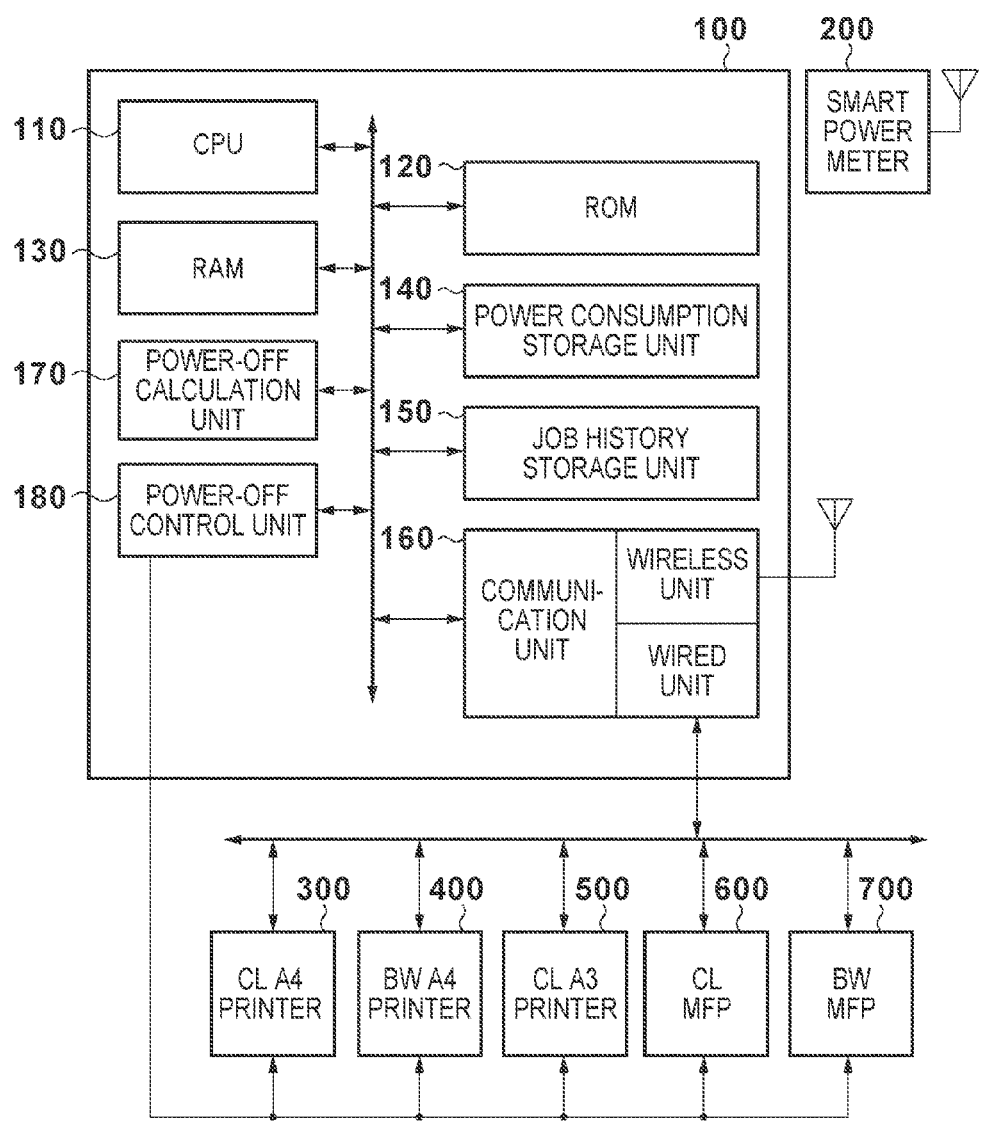
FIG. 1 is a diagram showing the hardware configuration of a power control apparatus according to a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Electric Power Control Apparatus

The following describes a first embodiment of the present invention with reference to FIGS. 1 to 4. First, a description of the hardware configuration of a power control apparatus of the present embodiment will be given with reference to FIG. 1. Reference numeral 100 denotes the power control apparatus. Reference numeral 200 denotes a smart power meter. The power control apparatus 100 includes a CPU 110, a ROM 120, a RAM 130, a power consumption storage unit 140, a job history storage unit 150, a communication unit 160, a power-off calculation unit 170, and a power-off control unit 180, and these components are connected via an internal bus so as to be able to communicate with each other. Also, the power control apparatus 100 is connected to printers 300, 400, and 500 and multifunction peripherals 600 and 700, which are targets of power supply control, and the smart power meter 200, thus constructing an image forming system.

The CPU 110 performs overall control of the power control apparatus 100. The ROM 120 stores, for example, a control program that is executed by the CPU 110. The RAM 130 is used as an area for execution of the control program and a work data area. The power consumption storage unit 140 stores power consumption amounts for each device monitored by the power control apparatus 100. The job history storage unit 150 stores a job history for each device monitored by the power control apparatus 100.

The communication unit 160 includes a wireless unit and a wired unit, and controls data communication performed with external devices. The power-off calculation unit 170 calculates a priority order according to which the devices managed by the power control apparatus 100 are to be powered off, and generates a power-off sequence table. The power-off control unit 180 outputs a power-off control signal to the devices managed by the power control apparatus 100 in accordance with the priority order defined in the power-off sequence table that was generated.

The smart power meter 200 includes, for example, a communication function typified by a smart meter, determines the amount of power that needs to be reduced (reduction power amount) according to changes in the amount of power that can be used in the system, and notifies the power control apparatus 100 of the reduction power amount. The printer 300 is a printer that can perform color (hereinafter, abbreviated as "CL") printing and is compatible with A4 sheets. The printer 400 is a printer that can perform monochrome (hereinafter, abbreviated as "BW") printing and is compatible with A4 sheets. The printer 500 is a printer that can perform CL printing and is compatible with A3 sheets. The multifunction peripheral 600 is a multifunction peripheral that can perform CL printing and includes copy and FAX functions. The multifunction peripheral 700 is a multifunction peripheral that can perform BW printing and includes copy and FAX functions.

Power-Off Control of Devices by Electric Power Control Apparatus

Figure 2:
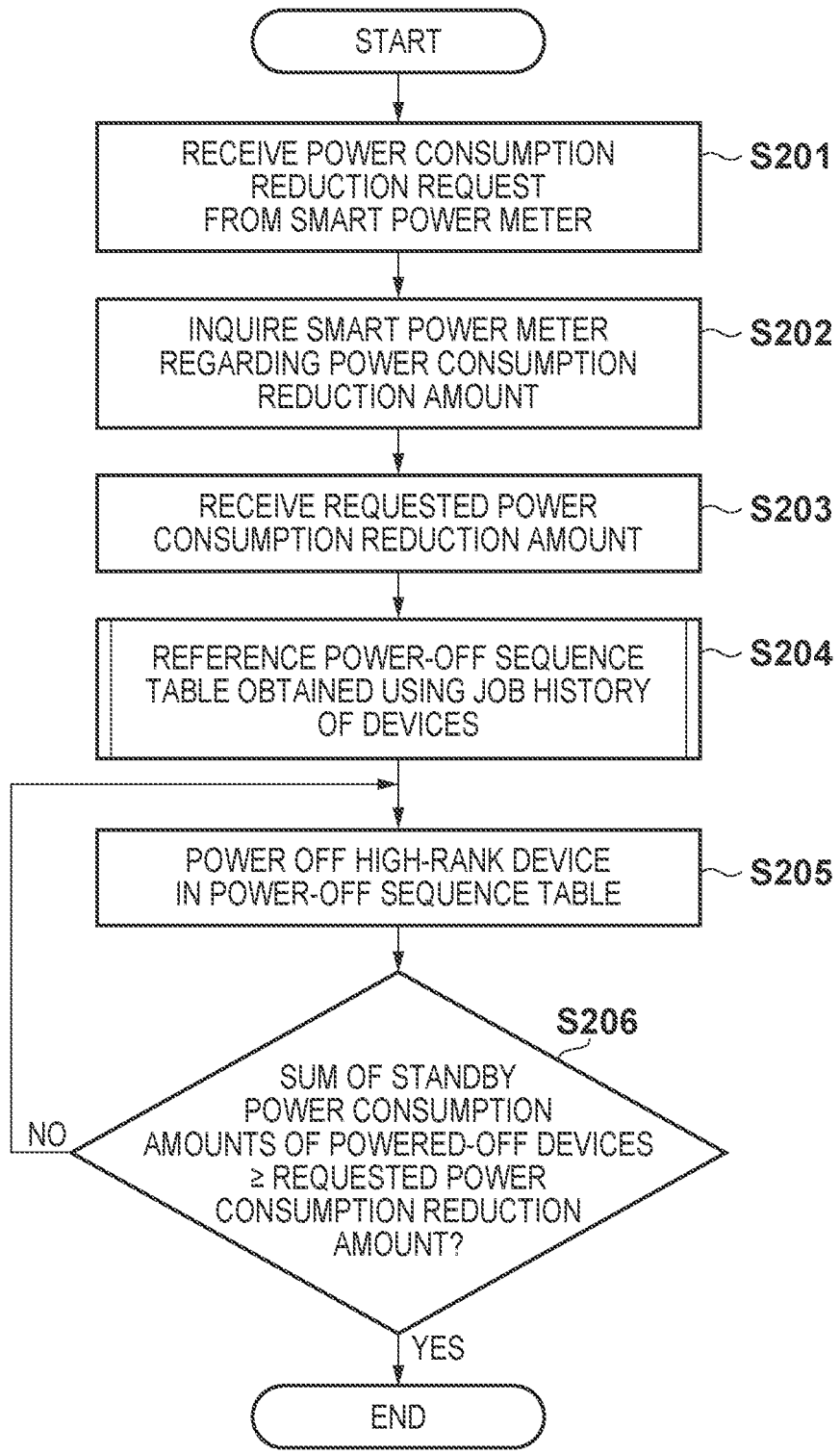
FIG. 2 is a flowchart showing control for powering off devices performed by the power control apparatus according to the first embodiment.

Next, power-off control (stop control) of devices performed by the power control apparatus will be described with reference to FIG. 2. The processing described below is realized by the CPU 110 reading out the control program stored in advance in the ROM 120 to the RAM 130 and executing the control program.

In step S201, the CPU 110 receives a power consumption reduction request, which is a request to reduce the power consumption, from the smart power meter 200 via the communication unit 160. Upon receiving the power consumption reduction request, in step S202 the CPU 110 inquires the smart power meter 200 regarding the power consumption reduction amount via the communication unit 160. Thereafter, in step S203 the CPU 110 receives a power consumption reduction amount from the smart power meter 200 via the communication unit 160 as a response to the inquiry.

Next, in step S204 the CPU 110 references the power-off sequence table that was generated by the power-off calculation unit 170 based on the job history of the devices managed by the job history storage unit 150. Subsequently, in step S205 the CPU 110 controls the power-off control unit 180 so as to determine which device is a high-rank device according to the sequence defined in the power-off sequence table and perform power-off (stop) control in order to reduce the power consumption of the determined device. Note that in step S205, instead of stopping the supply of power to the high-rank device, it is possible to stop the supply of power to only a specified portion of that device by, for example, causing the device to transition to the power saving mode. In this case, the amount of power that is consumed after transitioning to the power saving mode needs to be stored in the power consumption storage unit 140 in advance.

Thereafter, in S206 the CPU 110 determines whether the sum of the standby power consumption amounts of the devices that have been powered off in step S205, which are stored in the power consumption storage unit 140, is greater than the power consumption amount to be reduced as requested by smart power meter 200 in step S203. Here, if the sum of the standby power consumption amounts of the devices that have been powered off so far is greater than or equal to the reduction power amount requested by the smart power meter 200 (step S206: YES), this processing ends. On the other hand, if the sum of the standby power consumption amounts of the devices that have been powered off so far is less than the reduction power amount requested by the smart power meter 200 (step S206: NO), the procedure returns to step S205, and the CPU 110 successively powers off the next device in accordance with the power-off sequence table until the above-described sum is greater than or equal to the reduction power amount. In other words, the CPU 110 compares the sum of the standby power consumption amounts of the devices that have been powered off in step S205 with the power consumption amount to be reduced as requested by the smart power meter 200, and determines which devices are devices whose power consumption needs to be reduced.

Figure 4:
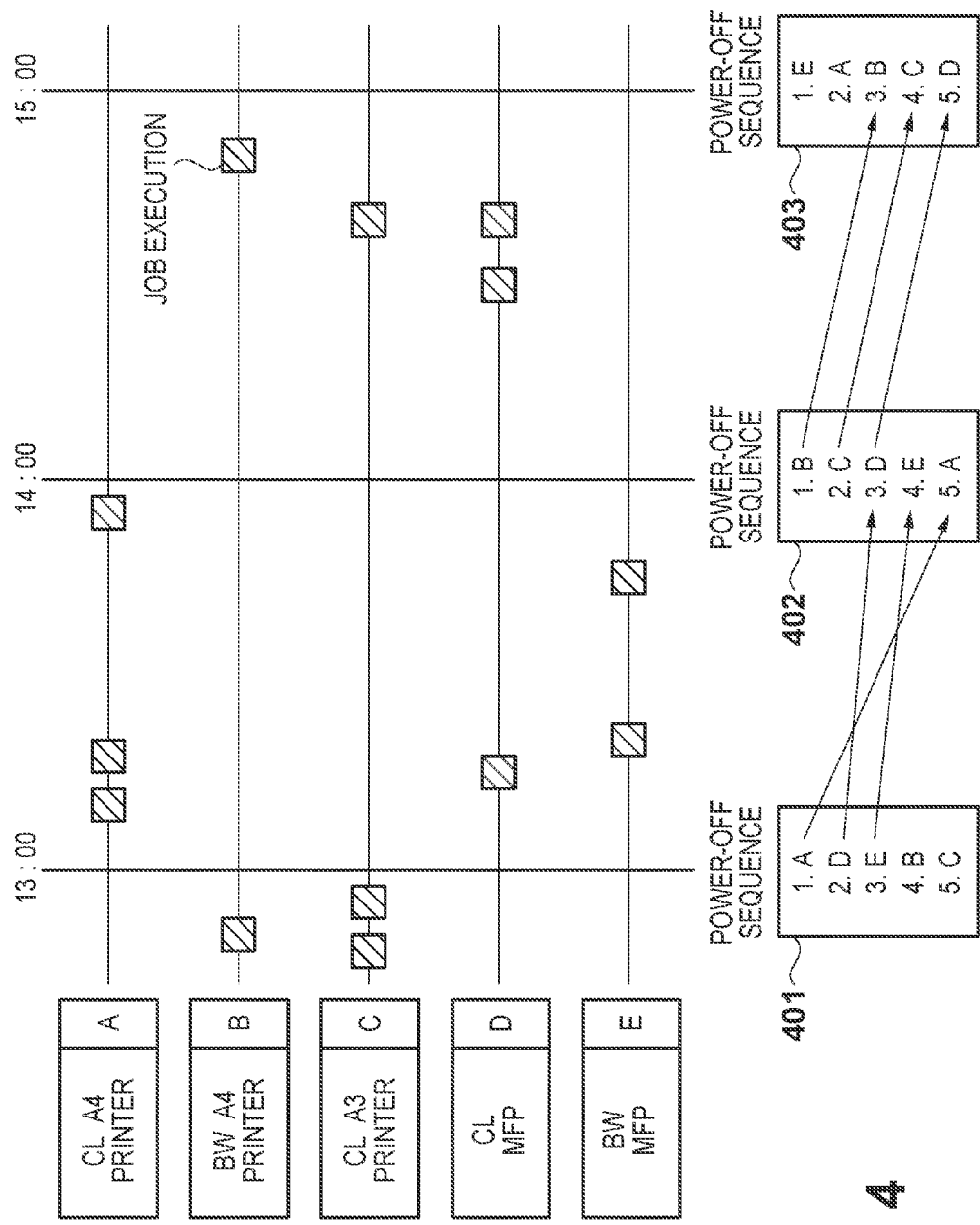
FIG. 4 is a diagram showing updating of a power-off sequence table according to time histories according to the first embodiment.

Note that in the present embodiment, the processing of step S205 is repeated until the sum of the standby power consumption amounts of the devices that have been powered off is greater than or equal to the requested reduction power amount. In other words, one device is turned off, then if the reduction power amount is less than the requested reduction power amount even after powering off that one device, the next device is powered off, and this processing repeated. However, if the power consumption table shown in FIG. 3 and the power-off sequence table shown in FIG. 4 are referenced, it can be determined in advance how many devices need to be powered off, and therefore it is possible to power off multiple high-rank devices at one time and omit the determination performed in step S206.

Sum of Power Consumption Amounts of Devices

The following describes the sum of the standby power consumption amounts of the devices that have been powered off, with reference to FIG. 3. FIG. 3 shows the power consumption amounts of devices that are stored in the power consumption storage unit 140. Also, as shown in FIG. 3, the power consumption storage unit 140 stores a standby power consumption amount and a power consumption amount during operation for each device. In step S206, the sum of the standby power consumption amounts of the devices that have been powered off is obtained from the device power consumption amounts stored in the power consumption storage unit 140. For example, if devices C and D stored in the power consumption storage unit 140 have been powered off so far, the sum of the standby power consumption amounts thereof is 85 W.

Updating of Power-Off Sequence Table

The following describes updating of the power-off sequence table in the present embodiment with reference to FIG. 4. FIG. 4 shows updating of the power-off sequence table according to time histories, and square boxes indicate positions at which jobs have been executed by devices. The updating of the power-off sequence table is performed by the power-off calculation unit 170. In FIG. 4, the CL A4 printer indicated as device A corresponds to the printer 300 in FIG. 1. Similarly, the BW A4 printer indicated as device B corresponds to the printer 400 in FIG. 1. Also, the CL A3 printer indicated as device C corresponds to the printer 500 in FIG. 1. Furthermore, the CL multifunction peripheral indicated as device D corresponds to the multifunction peripheral 600 in FIG. 1. Moreover, the BW multifunction peripheral indicated as device E corresponds to the multifunction peripheral 700 in FIG. 1.

The following describes a method for updating the power-off sequence table in accordance with the driving status of the devices for a previous predetermined period, such as at a one-hour interval. As shown in FIG. 4, at 13:00 the sequence A, D, E, B, C is defined in a power-off sequence table 401. It is then assumed that the devices executed jobs as described below in the one-hour period from 13:00 to 14:00. The device A performed job execution three times. The device B did not perform job execution. The device C did not perform job execution. The device D performed job execution one time. The device E performed job execution two times.

At 14:00, a power-off sequence table 402 is generated by updating the sequence from the above-described driving status to a sequence in which the job execution histories in the one-hour period from 13:00 (the previous one-hour period) are in ascending order. In other words, the device A that executed the most jobs becomes the lowest ranked. The devices E and D are then re-ordered to the next lowest ranks in order of the number of times they executed jobs. Accordingly, the sequence is updated to B, C, D, E, A in the power-off sequence table 402 at 14:00.

Next, it is then assumed that the devices executed jobs as described below in the one-hour period from 14:00 to 15:00. The device A did not perform job execution. The device B performed job execution one time. The device C performed job execution one time. The device D performed job execution two times. The device E did not perform job execution.

At 15:00, a power-off sequence table 403 is generated by updating the sequence from the above-described driving status to a sequence in which the number of job executions performed in the one-hour period from 14:00 are in ascending order. In other words, the device D that executed the most jobs becomes the lowest ranked. The devices C and B are then re-ordered to the next lowest ranks in order of the number of times they executed jobs and according to the sequence up to that time. Accordingly, the sequence is updated to E, A, B, C, D in the power-off sequence table 403 at 15:00. In this way, according to the present embodiment, the power-off sequence table is updated in accordance with job execution history at a predetermined time interval.

Second Embodiment

Figure 5:
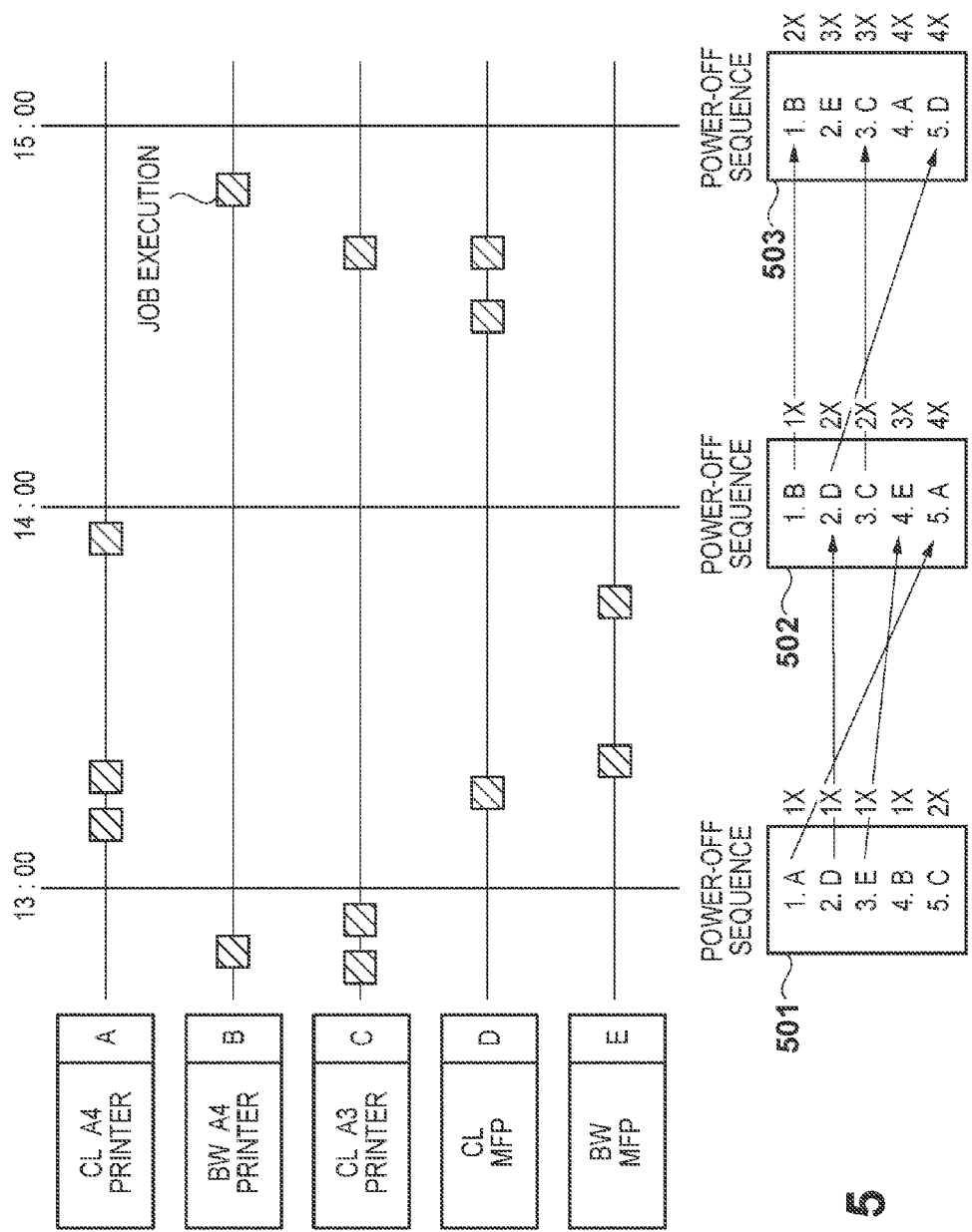
FIG. 5 is a diagram showing updating of the power-off sequence table according to cumulative numbers of times according to a second embodiment.

The following describes a second embodiment of the present invention with reference to FIG. 5. In the present embodiment, control of the updating of the power-off sequence table is different from that in the first embodiment. Specifically, whereas updating of the power-off sequence table is performed based on a job execution history (driving status) in a certain time period in the first embodiment, the power-off sequence table is updated based on cumulative numbers of times that job execution has been performed so far in the present embodiment.

Updating of Power-Off Sequence Table

The following describes the power-off sequence table of the second embodiment with reference to FIG. 5. FIG. 5 shows updating of the power-off sequence table according to cumulative numbers of times, and square boxes indicate positions at which jobs have been executed by devices. The updating of the power-off sequence table is performed by the power-off calculation unit 170. In FIG. 5, the CL A4 printer indicated as device A corresponds to the printer 300 in FIG. 1. Similarly, the BW A4 printer indicated as device B corresponds to the printer 400 in FIG. 1. Furthermore, the CL A3 printer indicated as device C corresponds to the printer 500 in FIG. 1. Furthermore, the CL multifunction peripheral indicated as device D corresponds to the multifunction peripheral 600 in FIG. 1. Moreover, the BW multifunction peripheral indicated as device E corresponds to the multifunction peripheral 700 in FIG. 1.

A description of the number of job executions performed in the various time periods shown in FIG. 5 will not be given since they are the same as those in FIG. 4. In the present embodiment, the sequence A, D, E, B, C is defined in a power-off sequence table 501 at 13:00. Also, the total number of times that job execution was performed by the devices at 13:00 is one time for A, one time for B, two times for C, one time for D, and one time for E.

Next, the total number of times that job execution was performed by the devices at 14:00 is four times for A, one time for B, two times for C, two times for D, and three times for E. A power-off sequence table 502 is thus generated by updating the sequence to a sequence in which the cumulative numbers of times that job execution has been performed up to 14:00 are in ascending order. In other words, the device A having the highest cumulative number of times that job execution was performed (a total of four times) becomes the lowest ranked. Thereafter, the device E is then re-ordered to the next lowest rank according to the cumulative number of times that job execution was performed. Here, unlike the first embodiment, although the device D performed job execution, the cumulative number of times that job execution was performed is two times for the device D, and therefore its rank in the sequence does not change.

Next, the total number of times that job execution was performed by the devices at 15:00 is four times for A, two times for B, three times for C, four times for D, and three times for E. A power-off sequence table 503 is thus generated by updating the sequence to a sequence in which the cumulative numbers of times that job execution has been performed up to 15:00 are in ascending order. In other words, the device D having the highest cumulative number of times that job execution was performed (a total of four times) becomes the lowest ranked. Here, although the device B and the device C performed job execution, the cumulative number of times that job execution was performed is two times and three times respectively, and therefore their ranks in the sequence do not change. In this way, according to the present embodiment, the power-off sequence table is updated in accordance with the cumulative numbers of times that job execution has been performed so far, in ascending order of the total value.

Third Embodiment

Figure 6:
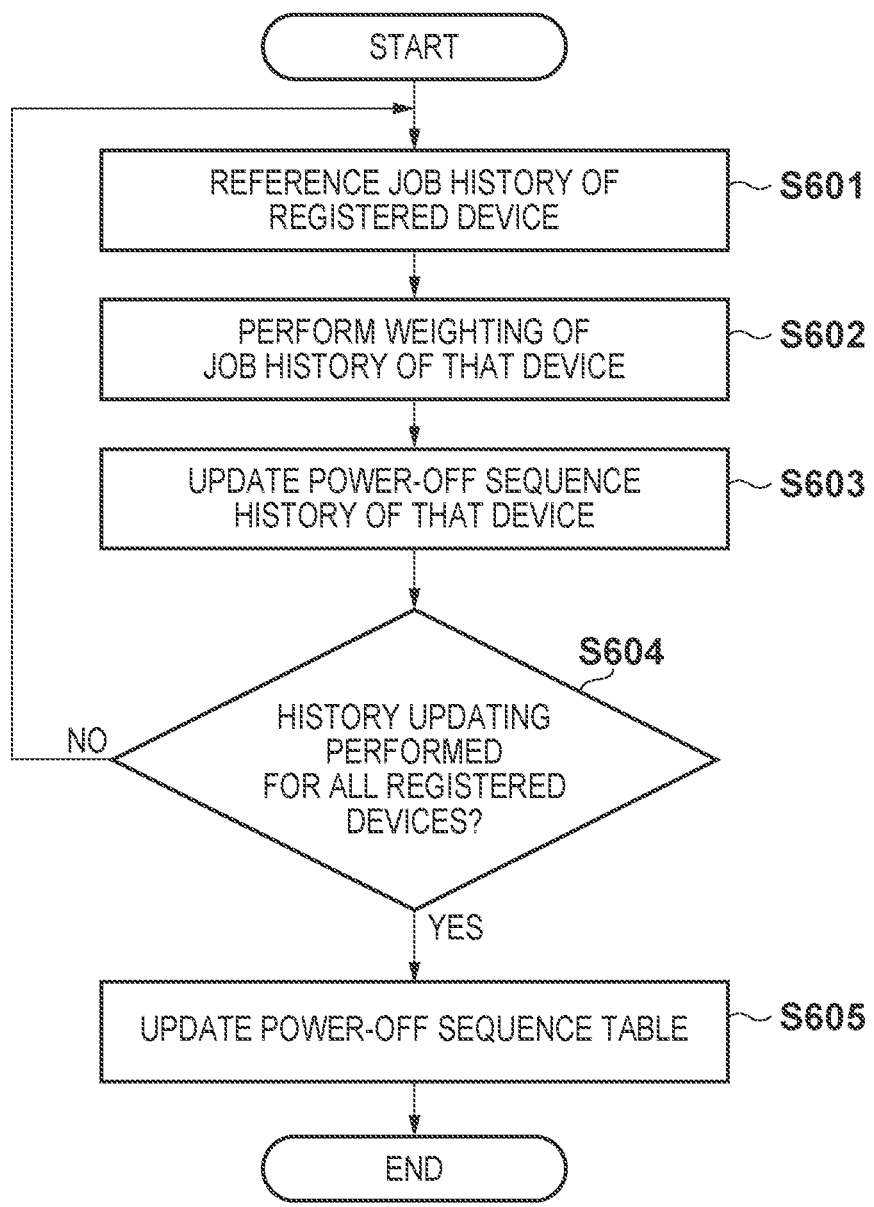
FIG. 6 is a flowchart showing control for powering off devices performed by a power control apparatus according to a third embodiment.

The following describes a third embodiment of the present invention with reference to FIG. 6. In the present embodiment, control of the updating of the power-off sequence table is different from that in the first and second embodiments. Specifically, whereas updating of the power-off sequence table is performed based on only the number of job executions performed in the first and second embodiments, the power-off sequence table is updated based on a job history that has been weighted in accordance with the types of jobs that were executed in the present embodiment.

Weighting of Job History

The following describes the weighting of the job history with reference to FIG. 6. The processing described below is realized by the CPU 110 reading out the control program stored in advance in the ROM 120 to the RAM 130 and executing the control program, and this processing is performed by the power-off calculation unit 170 under control of the CPU 110.

In step S601, the power-off calculation unit 170 references the job history of a device stored in the job history storage unit 150. In step S602, the power-off calculation unit 170 performs weighting in accordance with the content of the job history of that device. The weighting of the job history is performed using a coefficient of number of sheets and a coefficient of CL (color printing), based on one page of BW printing (monochrome printing). Letting BW=1 and CL=2, job history weighting=number of sheets (N)×(CL or BW). In other words, in the case of color printing, the value obtained by doubling the number of sheets that were printed is used as the job history value, and in the case of monochrome printing, the value of the number of sheets that were printed is used, as is, as the job history value.

Next, in step S603 the power-off calculation unit 170 updates the power-off sequence history of that device using the weighted job history. Thereafter, in S604 the power-off calculation unit 170 determines whether the updating of the power-off sequence history through the above-described job history weighting has been performed for all of the registered devices. If the updating of the power-off sequence history through the above-described job history weighting has been performed for all of the registered devices (step S604: YES), the procedure proceeds to step S605 in which the power-off calculation unit 170 updates the power-off sequence table. Note that the method of the first or second embodiment may be used to perform the updating of the power-off sequence table in step S605 based on the values updated in step S603. On the other hand, if the updating of the power-off sequence history through the above-described job history weighting has not been performed for all of the registered devices (step S604: NO), the procedure returns to step S601, and the power-off calculation unit 170 updates the job history of the next device. In this way, according to the present embodiment, the power-off sequence table is updated using a power-off sequence history obtained by weighting job histories.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The present invention can provide a power control apparatus that, in response to load control (a power-off request) from a smart power meter, effectively performs power-off control, without impairing user convenience, according to a power-off sequence table obtained using a job history and power consumption amounts, a method for controlling the same, and a storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106623 filed on May 11, 2011, which is hereby incorporated by reference herein in its entirety.

What is claimed is:

1. A power control apparatus capable of communication with a plurality of devices, the power control apparatus comprising:
    a storage unit that stores a history of jobs executed by each of the plurality of devices, the plurality of devices comprising at least one printing device;
    a determination unit that determines, among the plurality of devices, a device for which the power consumption is to be reduced, based on the job history stored by the storage unit; and
    a power control unit that performs control so as to reduce the power consumption of the device determined by the determination unit, in a case where a condition for reducing power consumption has been satisfied.

2. The power control apparatus according to claim 1, wherein the condition for reducing power consumption is satisfied in a case where a request to reduce power consumption has been received from an external apparatus.

3. The power control apparatus according to claim 1, wherein the determination unit determines that a device for which the number of job executions performed in a predetermined period is low is the device for which power consumption is to be reduced.

4. The power control apparatus according to claim 1, wherein the control performed by the power control unit includes stopping power supply to the device determined by the determination unit.

5. The power control apparatus according to claim 1, wherein the determination unit determines a priority order for stopping power supply such that the number of job executions performed by the devices in a predetermined period is in ascending order.

6. The power control apparatus according to claim 1, wherein the determination unit determines a priority order for stopping power supply such that the cumulative numbers of times that job execution was previously performed by the devices are in ascending order.

7. The power control apparatus according to claim 1, wherein the power control unit successively stops power supply to a device in accordance with the priority order determined by the determination unit until the sum of the power consumption amounts of the devices for which power supply was reduced is greater than or equal to a reduction power amount requested by an external apparatus.

8. The power control apparatus according to claim 1, further comprising a weighting unit that performs weighting of the job history in accordance with the types of jobs executed by the devices.

9. The power control apparatus according to claim 8,
    wherein the devices are each a printing apparatus that executes printing, and
    in a case where an executed job is color printing, the weighting unit uses a value obtained by doubling the number of sheets that were printed as a job history value, and in a case where an executed job is monochrome printing, the weighting unit uses the number of sheets that were printed as a job history value.

10. The power control apparatus according to claim 1, wherein the power control unit performs control so as to power off a first device in accordance with the priority order determined by the determination unit, determine whether an amount power saved by powering off the first device is greater than or equal to a requested reduction power amount, and power off a second device in accordance with the priority order determined by the determination unit when the amount power saved by powering off the first device is less than the requested reduction power amount.

11. The power control apparatus according to claim 10, wherein the power control unit performs further control so as to determine whether an amount power saved by powering off the first device and the second device is greater than or equal to the requested reduction power amount, and power off a third device in accordance with the priority order determined by the determination unit when the amount power saved by powering off the first device and the second device is less than the requested reduction power amount.

12. The power control apparatus according to claim 1, wherein the power control unit performs control so as to stop a supply of power to a portion of a first device in accordance with the priority order determined by the determination unit, determine whether an amount power saved by stopping the supply of power to the portion of the first device is greater than or equal to a requested reduction power amount, and stop a supply of power to a portion of a second device in accordance with the priority order determined by the determination unit when the amount power saved by stopping the supply of power to the portion of the first device is less than the requested reduction power amount.

13. The power control apparatus according to claim 12, wherein the power control unit performs further control so as to determine whether an amount power saved by stopping the supply of power to the portion of the first device and the portion of the second device is greater than or equal to the requested reduction power amount, and stop a supply of power to a portion of a third device in accordance with the priority order determined by the determination unit when the amount power saved by stopping the supply of power to the portion of the first device and the portion of the second device is less than the requested reduction power amount.

14. The power control apparatus according to claim 1, further comprising a weighting unit that performs weighting of the job history in accordance with the types of jobs executed by the devices such that the determination unit that determines the device for which the power consumption is to be reduced based on the job weighted history,
wherein the plurality of devices are each configured to execute printing, and
wherein in a case where an executed job is color printing, the weighting unit uses a value obtained by doubling the number of sheets that were printed as a job history value, and in a case where an executed job is monochrome printing, the weighting unit uses the number of sheets that were printed as a job history value.

15. A method for controlling a power control apparatus capable of communication with a plurality of devices, the method comprising:
storing a history of jobs executed by each of the plurality of devices, the plurality of devices comprising at least one printing device;
determining, among the plurality of devices, a device for which the power consumption is to be reduced, based on the stored job history; and
reducing the power consumption of the device determined in the determination step, in a case where a condition for reducing power consumption has been satisfied.

16. A non-transitory computer-readable storage medium storing a computer program for causing a computer to execute a method for controlling a power control apparatus capable of communication with a plurality of devices, the method comprising:
storing a history of lobs executed by each of the plurality of devices, the plurality of devices comprising at least one printing device;
determining, among the plurality of devices, a device for which the power consumption is to be reduced, based on the stored job history; and
reducing the power consumption of the device determined in the determination step, in a case where a condition for reducing power consumption has been satisfied.

* * * * *